US012576455B2

(12) United States Patent
Wellock et al.

(10) Patent No.: US 12,576,455 B2
(45) Date of Patent: Mar. 17, 2026

(54) FRICTION STIR WELDING PROCESS FOR LARGE METALLIC COMPONENTS

(71) Applicant: Standex International Corporation, Salem, NH (US)

(72) Inventors: William D. Wellock, North Andover, MA (US); Ryan Matthew Cullan, Tewksbury, MA (US)

(73) Assignee: Standex International Corporation, Salem, NH (US)

( * ) Notice: Subject to any disclaimer, the term of this patent is extended or adjusted under 35 U.S.C. 154(b) by 194 days.

(21) Appl. No.: 18/319,572

(22) Filed: May 18, 2023

(65) Prior Publication Data

US 2024/0131615 A1    Apr. 25, 2024
US 2024/0227063 A9    Jul. 11, 2024

Related U.S. Application Data

(60) Provisional application No. 63/417,811, filed on Oct. 20, 2022.

(51) Int. Cl.
B23K 20/00        (2006.01)
B23K 20/12        (2006.01)
              (Continued)

(52) U.S. Cl.
CPC .......... B23K 20/126 (2013.01); B32B 15/016 (2013.01); C22F 1/04 (2013.01); B23K 2101/185 (2018.08); B23K 2103/10 (2018.08)

(58) Field of Classification Search
CPC ............. B23K 20/1255; B23K 20/122; B23K 20/126; B23K 20/1235; B23K 20/1225;
              (Continued)

(56) References Cited

U.S. PATENT DOCUMENTS 5,066,342 A    11/1991  Rioja et al.
5,697,511 A    12/1997  Bampton
              (Continued)

FOREIGN PATENT DOCUMENTS

CA      2922119 A1    3/2015
CN      1080851 C     6/1998
              (Continued)

OTHER PUBLICATIONS

JP2006124779A computer english translation (Year: 2006).*
              (Continued)

*Primary Examiner* — Erin B Saad
(74) *Attorney, Agent, or Firm* — Saxton & Stump, LLC

(57)              ABSTRACT

A method for forming a large metallic component, a friction stir welded component and a friction stir welded blank are provided. The method includes positioning a first metallic plate and a second metallic plate in an abutting arrangement. The first metallic plate and the second metallic plate have corresponding faying surfaces at a point of abutment. A backing plate is attached spanning the point of abutment adjacent the faying surfaces. The first metallic plate is friction stir welded to the second metallic plate to form a friction stir weld along the faying surfaces. The backing plate receives an end of a friction stir welding tool curing the friction stir welding. The backing plate is removed to form a welded blank. The welded blank is formed into a component form. The component is heat treated and aged to form the large metallic component. The friction stir weld in the welded blank has a stable microstructure having little or no abnormal grain growth during elevated temperature forming, heat treatment and aging.

21 Claims, 15 Drawing Sheets

(51) Int. Cl.
  B32B 15/01       (2006.01)
  C22F 1/04        (2006.01)
  *B23K 101/18*        (2006.01)
  *B23K 103/10*        (2006.01)

(58) Field of Classification Search
  CPC . B23K 20/124; B23K 20/125; B23K 2103/10
  See application file for complete search history.

(56) References Cited

U.S. PATENT DOCUMENTS

| | | | |
|---|---|---|---|
| 5,718,366 A * | 2/1998 | Colligan | B23K 20/125 228/2.1 |
| 5,769,306 A * | 6/1998 | Colligan | B23K 20/126 228/112.1 |
| 5,839,636 A | 11/1998 | Fleischmann | |
| 5,971,252 A | 10/1999 | Rosen et al. | |
| 5,975,406 A | 11/1999 | Mahoney et al. | |
| 6,006,569 A | 12/1999 | Shrayer et al. | |
| 6,045,027 A | 4/2000 | Rosen et al. | |
| 6,070,784 A | 6/2000 | Holt et al. | |
| 6,138,895 A | 10/2000 | Oelgoetz et al. | |
| 6,168,066 B1 | 1/2001 | Arbegast | |
| 6,199,419 B1 | 3/2001 | Shrayer et al. | |
| 6,213,379 B1 | 4/2001 | Takeshita et al. | |
| 6,227,430 B1 | 5/2001 | Rosen et al. | |
| 6,230,957 B1 | 5/2001 | Arbegast et al. | |
| 6,230,958 B1 | 5/2001 | Coletta et al. | |
| 6,237,835 B1 | 5/2001 | Litwinski et al. | |
| 6,253,987 B1 | 7/2001 | Coletta et al. | |
| 6,364,197 B1 | 4/2002 | Oelgoetz et al. | |
| 6,422,514 B1 | 7/2002 | Clark et al. | |
| 6,460,752 B1 * | 10/2002 | Waldron | B23K 20/126 228/2.1 |
| 6,484,924 B1 | 11/2002 | Forrest | |
| 6,562,154 B1 | 5/2003 | Rioja et al. | |
| 6,779,707 B2 | 8/2004 | Dracup et al. | |
| 6,880,743 B1 | 4/2005 | Coletta et al. | |
| 6,986,452 B2 | 1/2006 | Dracup et al. | |
| 6,994,242 B2 | 2/2006 | Fuller et al. | |
| 7,156,276 B2 * | 1/2007 | Slattery | B23K 20/126 228/2.1 |
| 7,356,897 B2 | 4/2008 | Burton et al. | |
| 7,416,105 B2 | 8/2008 | Pitt et al. | |
| 7,490,752 B2 | 2/2009 | Ehrstram et al. | |
| 7,624,910 B2 | 12/2009 | Barnes et al. | |
| 7,690,164 B2 | 4/2010 | Walker et al. | |
| 7,699,206 B2 | 4/2010 | Matlack et al. | |
| 7,774,910 B2 | 8/2010 | Baumann et al. | |
| 7,866,532 B1 | 1/2011 | Potter et al. | |
| 7,975,896 B2 * | 7/2011 | Maciel | B23K 20/122 228/2.1 |
| 7,992,761 B2 | 8/2011 | Baumann et al. | |
| 8,052,030 B2 | 11/2011 | Burton et al. | |
| 8,123,104 B1 | 2/2012 | Potter et al. | |
| 8,141,764 B1 | 3/2012 | Potter et al. | |
| 8,141,859 B2 | 3/2012 | Matlack et al. | |
| 8,196,868 B2 | 6/2012 | Kutter et al. | |
| 8,196,869 B2 | 6/2012 | Kutter et al. | |
| 8,210,778 B2 | 7/2012 | Matlack et al. | |
| 8,393,582 B1 | 3/2013 | Kutter et al. | |
| 8,438,930 B2 | 5/2013 | Rogers et al. | |
| 8,439,250 B2 | 5/2013 | Takeshita et al. | |
| 8,720,830 B1 | 5/2014 | Szatkowski | |
| 8,992,149 B2 | 3/2015 | Dixon et al. | |
| 9,022,376 B2 | 5/2015 | Matlack et al. | |
| 9,090,950 B2 | 7/2015 | Hales et al. | |
| 9,234,351 B1 | 1/2016 | Echelman | |
| 9,261,295 B1 | 2/2016 | Schmidt et al. | |
| 9,425,693 B2 | 8/2016 | Wang et al. | |
| 9,464,847 B2 | 10/2016 | Maurer et al. | |
| 9,511,461 B2 | 12/2016 | Baumann et al. | |
| 9,513,059 B2 | 12/2016 | Maurer | |
| 9,820,614 B1 | 11/2017 | Dingler | |
| 9,850,008 B2 | 12/2017 | Zeigler | |
| 9,914,550 B1 | 3/2018 | Price et al. | |
| 9,951,997 B2 | 4/2018 | Maurer et al. | |
| 10,024,757 B1 | 7/2018 | Niehues | |
| 10,052,797 B2 | 8/2018 | Snyder et al. | |
| 10,105,791 B2 | 10/2018 | Comfort et al. | |
| 10,359,239 B1 | 7/2019 | Jansen et al. | |
| 10,532,425 B2 | 1/2020 | Rose et al. | |
| 10,569,908 B1 | 2/2020 | Coyne et al. | |
| 10,570,984 B1 | 2/2020 | Shannon | |
| 10,612,716 B1 | 4/2020 | Campbell et al. | |
| 10,640,237 B2 | 5/2020 | Dunn et al. | |
| 10,688,592 B1 | 6/2020 | Vickers | |
| 10,712,231 B1 | 7/2020 | Shannon | |
| 10,713,516 B2 | 7/2020 | Shannon | |
| 10,717,550 B1 | 7/2020 | Zegler | |
| 10,718,294 B1 | 7/2020 | Zegler | |
| 10,766,626 B2 | 9/2020 | Leon et al. | |
| 10,889,067 B1 | 1/2021 | Eller et al. | |
| 10,946,986 B1 | 3/2021 | Tanner et al. | |
| 10,974,853 B1 | 4/2021 | Burcar et al. | |
| 10,987,754 B1 | 4/2021 | Eller et al. | |
| 11,020,815 B2 | 6/2021 | Leon et al. | |
| 11,036,723 B1 | 6/2021 | Cooke et al. | |
| 11,066,193 B1 | 7/2021 | Shannon | |
| 11,071,931 B1 | 7/2021 | Breidenbach | |
| 11,092,111 B1 | 8/2021 | Bridges et al. | |
| 11,143,026 B2 | 10/2021 | Sercel et al. | |
| 11,174,046 B2 | 11/2021 | Sinclair | |
| 11,276,159 B1 | 3/2022 | Shannon | |
| 11,285,664 B2 | 3/2022 | Snyder et al. | |
| 11,286,023 B2 | 3/2022 | Shinn et al. | |
| 11,354,881 B2 | 6/2022 | Shannon | |
| 11,377,237 B1 | 7/2022 | Monda et al. | |
| 11,401,053 B2 | 8/2022 | Mansour et al. | |
| 11,420,146 B1 | 8/2022 | Snyder et al. | |
| 11,484,967 B2 | 11/2022 | Eller et al. | |
| 11,673,695 B2 | 6/2023 | Kline | |
| 11,718,426 B1 | 8/2023 | Duschl et al. | |
| 11,772,188 B1 | 10/2023 | Sargent | |
| 2003/0042292 A1 * | 3/2003 | Hatten | B23K 20/128 228/2.1 |
| 2003/0075584 A1 * | 4/2003 | Sarik | B23K 20/122 228/2.1 |
| 2004/0079454 A1 * | 4/2004 | Babel | B21D 22/14 148/527 |
| 2005/0045694 A1 * | 3/2005 | Subramanian | B23K 37/06 228/112.1 |
| 2006/0177284 A1 | 8/2006 | Keener et al. | |
| 2007/0215675 A1 | 9/2007 | Barnes | |
| 2008/0003401 A1 | 1/2008 | Barnes et al. | |
| 2008/0047222 A1 | 2/2008 | Barnes | |
| 2008/0099534 A1 | 5/2008 | Brice et al. | |
| 2008/0257936 A1 * | 10/2008 | Trapp | B23K 20/124 228/2.3 |
| 2009/0123778 A1 * | 5/2009 | Russell | B23K 20/1225 228/112.1 |
| 2009/0255980 A1 | 10/2009 | Li et al. | |
| 2009/0307181 A1 | 12/2009 | Colby et al. | |
| 2010/0038832 A1 * | 2/2010 | Rosal | B23K 20/1255 228/2.1 |
| 2010/0078462 A1 * | 4/2010 | Babb | B23K 20/1235 228/102 |
| 2010/0096438 A1 * | 4/2010 | Sato | B23K 20/122 228/114 |
| 2010/0140321 A1 | 6/2010 | Eller et al. | |
| 2010/0176182 A1 * | 7/2010 | Hanlon | B23K 20/126 228/2.1 |
| 2010/0243714 A1 * | 9/2010 | Allehaux | B23K 20/1235 228/2.1 |
| 2011/0062219 A1 * | 3/2011 | Bezaire | B23K 20/1285 228/114.5 |
| 2011/0180587 A1 * | 7/2011 | Trapp | B23K 20/1265 228/2.1 |
| 2012/0055977 A1 * | 3/2012 | Steel | B23K 20/1255 228/2.1 |
| 2012/0090738 A1 * | 4/2012 | Hales | C21D 9/50 148/400 |

(56) References Cited

U.S. PATENT DOCUMENTS

| | | | |
|---|---|---|---|
| 2012/0185075 A1* | 7/2012 | Babb | B23K 20/1235 |
| | | | 700/145 |
| 2013/0037601 A1* | 2/2013 | Eller | B23K 37/0536 |
| | | | 228/101 |
| 2013/0068825 A1* | 3/2013 | Rosal | B23K 20/1215 |
| | | | 228/2.1 |
| 2013/0146250 A1 | 6/2013 | Eller et al. | |
| 2013/0146437 A1 | 6/2013 | Maurer et al. | |
| 2013/0153171 A1 | 6/2013 | Nagurny et al. | |
| 2014/0146471 A1 | 5/2014 | Liu et al. | |
| 2014/0207274 A1* | 7/2014 | Ross | B23K 20/125 |
| | | | 700/207 |
| 2016/0151855 A1* | 6/2016 | Fukuda | B23K 20/122 |
| | | | 228/114.5 |
| 2018/0050419 A1* | 2/2018 | Das | B23K 20/126 |
| 2018/0339783 A1* | 11/2018 | Leon | B64D 33/02 |
| 2020/0269998 A1 | 8/2020 | Sinclair | |
| 2021/0146471 A1 | 5/2021 | Rodriguez et al. | |
| 2021/0205918 A1* | 7/2021 | Fujii | B23K 20/1225 |
| 2022/0144457 A1 | 5/2022 | Sinclair | |
| 2025/0100069 A1* | 3/2025 | Macek | B23K 20/24 |

FOREIGN PATENT DOCUMENTS

| | | | |
|---|---|---|---|
| CN | 1789474 | A | 6/2006 |
| CN | 104596361 | A | 5/2015 |
| DE | 69700975 | T2 | 5/2000 |
| DE | 69702636 | T2 | 11/2000 |
| DE | 69724326 | T2 | 2/2004 |
| DE | 69928471 | T2 | 7/2006 |
| DE | 112014001336 | T5 | 12/2015 |
| EP | 1510281 | A2 | 3/2005 |
| EP | 1527843 | A1 | 5/2005 |
| EP | 1857219 | A1 | 11/2007 |
| EP | 2693033 | A1 | 2/2014 |
| EP | 2859982 | A2 | 4/2015 |
| EP | 3300829 | A1 | 4/2018 |
| EP | 3406750 | A1 | 11/2018 |
| GB | 2456417 | A | 7/2009 |
| JP | 2001001059 | A | 1/2001 |
| JP | 2005074518 | A | 3/2005 |
| JP | 3873021 | B2 | 1/2007 |
| JP | 2017082323 | A | 5/2017 |
| JP | 2018204099 | A | 12/2018 |
| KR | 101744065 | B1 | 7/2012 |
| PH | 12015501970 | A1 | 1/2016 |
| WO | 2003092950 | B1 | 11/2003 |
| WO | 2006055530 | A1 | 5/2006 |
| WO | 2011009080 | A2 | 1/2011 |
| WO | 2011034670 | A1 | 3/2011 |
| WO | 2011043968 | A3 | 4/2011 |
| WO | 2012106606 | A2 | 8/2012 |
| WO | 2013023083 | A3 | 2/2013 |
| WO | 2014164501 | A1 | 10/2014 |
| WO | 2015126810 | A1 | 8/2015 |
| WO | 2017136650 | A1 | 8/2017 |
| WO | 2017176848 | A1 | 10/2017 |
| WO | 2021231857 | A2 | 11/2021 |

OTHER PUBLICATIONS

WO2014/0181431 computer english translation (Year: 2014).*

Shapes, https://www.shapesbyhydro.com/en/material-science/a-quick-guide-to-understanding-aluminium-temper-designations/, Jul. 6, 2022 (Year: 2022).*

Computer English translation JP-2002224860-A (Year: 2002).*

EP Extended Search Report, Feb. 6, 2024, 11pgs.

"NASA Spin Forming"; https://www.nasa.gov/topics/technology/features/spin-forming.html, accessed Apr. 13, 2023, 2 pgs.

M.K.B. Givi and P. Asadi; "Advances in Friction-Stir Welding and Processing"; Woodhead Publishing in Mechanical Engineering; 2014, pp. 156-157.

G.E. Petter, et al., "Heat Treatment of Friction-Stir-Welded 7050 Aluminum Plates", NTRS—NASA Technical Reports Serve, Mar. 1, 2006, pp. 19-20, available at https://ntrs.nasa.gov/citations/20100014157.

Piascik et al., "Spin Forming of an Aluminum 2219-T6 Aft Bulkhead for the Orion Multi-Purpose Crew Vehicle: Phase II Supplemental Report", NTRS—NASA Technical Reports Server, Dec. 1, 2015.

Metallic Materials Properties Development and Standardization MMPDS-15, Chapter 3, Aluminum Alloys, Jul. 2020, 2 pgs.

M. Eller, et al., "Friction Stir Welded Aluminum-Lithium (Al—Li) 2050 Blanks for Spin Forming", NTRS—NASA Technical Reports Server, Mar. 15, 2022, pp. 1-24, available at https://ntrs.nasa.gov/citations/20220002967.

NASA Report # NESC-RP-13-00884 Section 7.6.

W. A. Tayon et al., "NASA Document ID # 20140001083: Investigation of Abnormal grain growth in a Friction Stir welded and Spin-Formed Al—Li Alloy 2195 Crew Module", 8 pgs., date acquired Mar. 7, 2014, https://ntrs.nasa.gov/citations/20140001083.

AMS 2770, Aerospace Material Specification, SAE International, 21 pages, revised Aug. 2020.

* cited by examiner

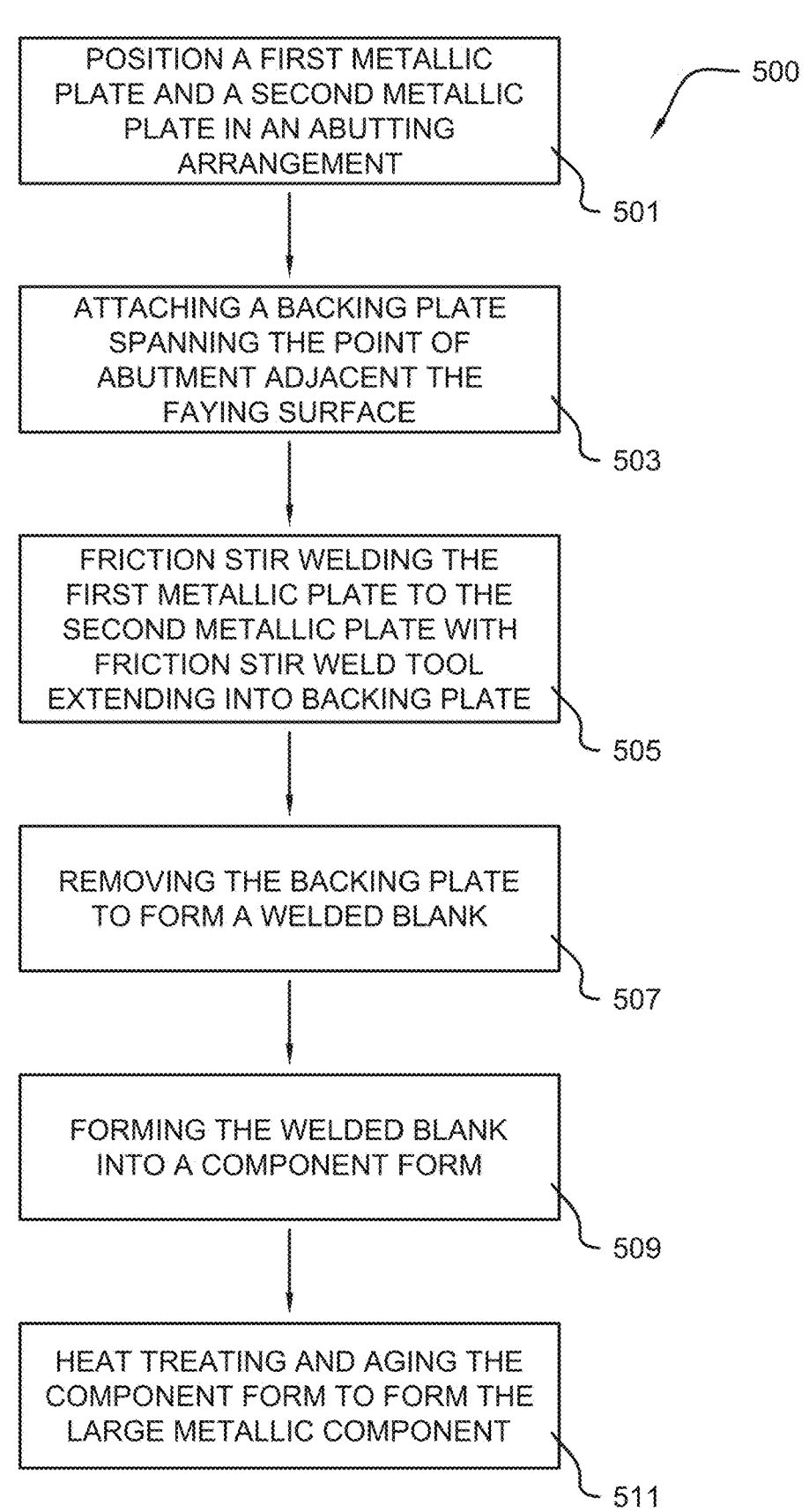

POSITION A FIRST METALLIC PLATE AND A SECOND METALLIC PLATE IN AN ABUTTING ARRANGEMENT

500

501

ATTACHING A BACKING PLATE SPANNING THE POINT OF ABUTMENT ADJACENT THE FAYING SURFACE

503

FRICTION STIR WELDING THE FIRST METALLIC PLATE TO THE SECOND METALLIC PLATE WITH FRICTION STIR WELD TOOL EXTENDING INTO BACKING PLATE

505

REMOVING THE BACKING PLATE TO FORM A WELDED BLANK

507

FORMING THE WELDED BLANK INTO A COMPONENT FORM

509

HEAT TREATING AND AGING THE COMPONENT FORM TO FORM THE LARGE METALLIC COMPONENT

OPTICAL MICROGRAPHS FOR
A) AS FSW-ONLY;
B) AFTER 25% HR + SHT;
C) AFTER 25% HR + IAT + SHT

FSW (AS-WELDED)    ANNEALED FSW    FSW AFTER SOL. HT. QUENCH, AND AGE HT.

FIG. 10

|  | UTS (ksi) | YTS (ksi) | % Elong. |
|---|---|---|---|
| MINIMUMS | 68 MIN | 57 MIN | 7% MIN |
| AVG TOP | 69.4 | 61 | 13% |
| AVG MID | 68.9 | 59.2 | 19% |
| AVG BOTTOM | 66.9 | 61.2 | 6% |

1800

FRICTION STIR WELDING PROCESS FOR LARGE METALLIC COMPONENTS

FIELD OF THE INVENTION

The present disclosure is generally directed to methods for forming large metallic components utilizing friction stir welding and spin forming and formed large metallic components.

BACKGROUND OF THE INVENTION

Friction stir welding is a solid-state joining process that provides a method of joining metal components without melting of the workpiece material. As this is a solid-state process, friction stir welding results in a microstructure that is more desirable than traditional welding techniques. However, friction stir welding has drawbacks, including, for example, the mechanical properties of the joined parts after heat treatment and/or aging. For example, subjecting a friction stir weld to an elevated temperature forming operation, followed by solution heat treat & quench in very large structures was not successful due to issues with the weld's response to the forming stresses and the heat treatment process. In these instances, the drawbacks of friction stir welding has forced manufacturers of large components to utilize large monolithic plate stock to avoid welding all together.

Use of large components having substantially uniform properties across the component is particularly important in formed aerospace structures, such as those structures described in U.S. Pat. No. 6,006,569, which is hereby incorporated by reference in its entirety. One method of manufacturing these components is spin forming of the components. According to NASA, "[w]hat makes [the manufacturing of large capsule components] unique is that the spin forming process can create the complex crew module shape out of one piece of metal. A normal build would require several pieces of material being welded together into a capsule shape. The spin forming process results in fewer welds, which reduces the chances of defects, which makes the capsule safer for the astronauts" (https://www.nasa.gov/topics/technology/features/spin-forming.html). However, obtaining blanks for use in the spin forming process that are large enough to form these components without welds is difficult and/or prohibitively expensive. Therefore, it is desirable to have a joining process that does not provide drawbacks typically seen in welded components.

In known processes utilizing friction stir welding, the friction stir welding is performed after forming and heat treatment and yields "weld joint efficiencies typically between 65 and 96%" (Woodhead Publishing, "Advances in Friction-Stir Welding and Processing", 2014, p. 157). Smaller structures would occasionally perform friction stir welding either before or after the solution-heat treated state and subject the weld to a post weld artificial ageing heat treatment. However, these known approaches did not involve any sort of mechanical forming (Petter, et al., "Heat Treatment of Friction-Stir-Welded 7050 Aluminum Plates", NTRS—NASA Technical Reports Serve, Mar. 1, 2006, available at https://ntrs.nasa.gov/citations/20100014157). Petter et al. includes heat treatments on plates 0.270 in. (≈6.86 mm) thick milled from plates 4.5 in. (114.3 mm) thick, where a pre-weld solution heating at 890° F. (477° C.) is performed for 1 hour, then cooled in air. A friction stir welding operation is provided to the plates and after the friction stir welding a solution heat treatment is provided for 10 minutes, where the workpiece is quenched and held at room temperature for 96 hours. Thereafter, the workpiece is aged at 250° F. (121° C.) for 5 hours followed by 325° F. (163° C.) for 27 hours. When subjected to solution heat treatment, the friction stir welds of Petter et al., tend to be microstructurally unstable and exhibit a phenomenon called abnormal grain growth (AGG) as shown in FIG. 9-12.

One attempt to provide large component blanks for use in a spin forming process included a crew structure component for NASA Langley and Lockheed Martin formed from 2195 aluminum alloy. The formation of the blank for this structure included a double-sided friction stir weld (FSW). That is, a friction stir weld was formed along the faying surfaces on opposite sides of the metallic workpieces to be joined. The heat treatment utilized resulted in undesirable abnormal grain growth (AGG), particularly in the center, of the weld. The formation of the AGG in these welds is shown in FIG. 9. In addition, AGG growth is shown in Piascik et al., "Spin Forming of an Aluminum 2219-T6 Aft Bulkhead for the Orion Multi-Purpose Crew Vehicle: Phase II Supplemental Report", NTRS—NASA Technical Reports Server, Dec. 1, 2015. The nucleation of AGG in the weld can significantly lower the weld strength and ductility below design minimum values listed in the Metallic Materials Properties Development and Standardization MM PDS-15, Chapter 3, July 2020.

Another attempt to address the formation of AGG included a special recover anneal heat treatment before the solution heat treatment to stabilize the microstructure after a friction stir welding operation. (Eller, et al., "Friction Stir Welded Aluminum-Lithium (Al—Li) 2050 Blanks for Spin Forming", NTRS—NASA Technical Reports Server, Mar. 15, 2022, available at https://ntrs.nasa.gov/citations/20220002967). In this process, a "recovery anneal" was performed on a new 2050 aluminum alloy. The recovery anneal was an intermediate heat treatment step after friction stir welding and forming, but before solution heat treat to stabilize the microstructure. While this process resulted in a reduction of AGG in the weld, there is still a desire to further reduce the formation of AGG and improve the mechanical properties, including ductility, of the joined workpieces.

What is needed, is a friction stir welding, forming, and heat treatment process that may be applied to large metallic structures that maintains a stable microstructure to yield high strength welds of high joint efficiency. Other features and advantages will be made apparent from the present specification. The teachings disclosed extend to those embodiments that fall within the scope of the claims, regardless of whether they accomplish one or more of the aforementioned needs.

SUMMARY OF THE INVENTION

According to the present disclosure, a method for forming a large metallic component is provided. The method includes positioning a first metallic plate and a second metallic plate in an abutting arrangement. The first metallic plate and the second metallic plate have corresponding faying surfaces at a point of abutment. A backing plate is attached spanning the point of abutment adjacent the faying surfaces. The first metallic plate is friction stir welded to the second metallic plate to form a friction stir weld along the faying surfaces. The backing plate receives an end of a friction stir welding tool curing the friction stir welding. The backing plate is removed to form a welded blank. The welded blank is formed into a component form. The component is heat treated and aged to form the large metallic component. The friction stir weld in the welded blank has a stable microstructure having little or no abnormal grain growth during elevated temperature forming, heat treatment and aging.

According to the present disclosure, a friction stir welded component is provided. The friction stir welded component includes a first metallic plate and a second metallic plate joined at corresponding faying surfaces by a friction stir weld. The friction stir welded component also includes a backing plate spanning the point of abutment adjacent the faying surfaces. The friction stir weld terminates in the backing plate.

According to the present disclosure, a friction stir welded blank is provided. The friction stir welded blank includes a first metallic plate and a second metallic plate joined at corresponding faying surfaces by a friction stir weld. The friction stir weld has a stable microstructure having little or no abnormal grain growth during elevated temperature forming, heat treatment and aging.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

FIG. 5 shows a flowchart illustrating a process according to the present disclosure.

FIG. 10 shows photomicrographs from welded samples welded according to a friction stir welding procedure not utilizing a backing plate.

Wherever possible, the same reference numbers will be used throughout the drawings to represent the same parts.

DETAILED DESCRIPTION OF THE INVENTION

Embodiments of the present invention include a friction stir welding, forming, and heat treatment process that may be applied to large aerospace structures, and maintain a stable microstructure through both forming and heat treatment to yield high strength welds of greater than 95% joint efficiency. The methods according to the present disclosure permit procurement of narrower commodity metallic plates, such as aluminum plates, which may be sourced from multiple manufacturers, in a far more cost-effective manner, than procuring large monolithic plate stock sourced from a single manufacturer, as is done currently, to avoid undesirable welding effects.

The method according to the present disclosure includes a single-sided weld approach that utilizes a friction stir welding process, wherein the tip of the friction stir welding tool extends past the thickness of abutting metallic plates into a backing plate that is removed in a subsequent machining operation prior to further manufacturing heat treatments or deformation process steps. The removal of the sacrificial backing plate aids in formation or maintenance of a stable microstructure in the formed and heat-treated component. By "stable microstructure," as utilized herein, it is meant that the microstructure has little or no abnormal grain growth (AGG) in subsequent elevated temperature forming and heat treatment and/or aging.

Figure 1:
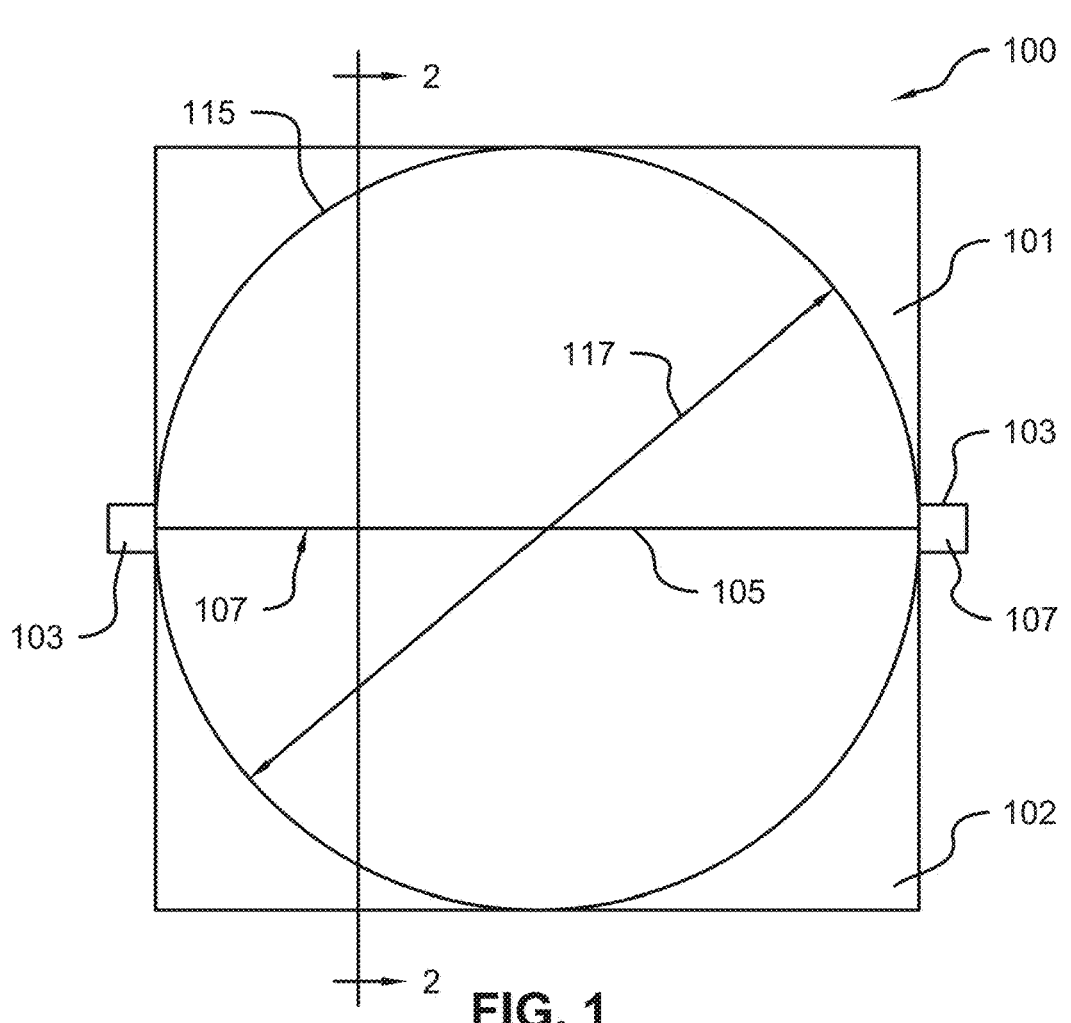
FIG. 1 shows a schematic view of a weld setup according to the present disclosure prior to welding.
Figure 2:
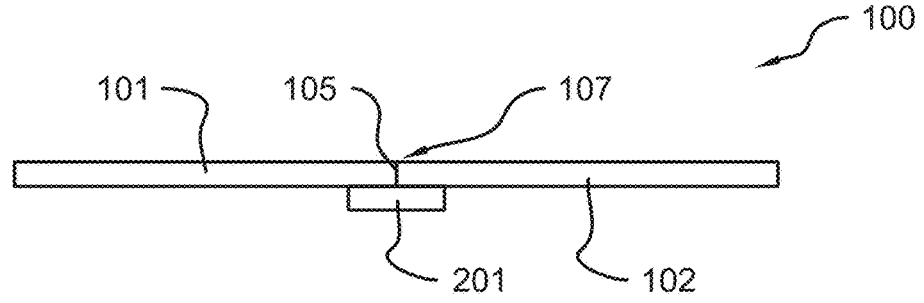
FIG. 2 shows a sectional view of FIG. 1 taking in direction 2-2.

FIGS. 1-4 shows a welding setup 100 according to an embodiment of the disclosure and FIG. 5 illustrates a flowchart illustrating method 500 according to an embodiment of the disclosure. Method 500 according to the present disclosure includes a method for formation of large metallic components. As utilized herein, "large components" include components that exceed a diameter or other dimension that is difficult or impractical to obtain without utilizing a joining technique, such as welding. For example, large components may be components having a dimension greater than 100 inches, greater than 150 inches, greater than 200 inches or greater than 250 inches. As shown in FIG. 1 and FIG. 2, the final geometry of the spin blank 115 prior to forming is superimposed on the welding setup 100 to show the size of the spin blank 115 that will result after welding and machining. Specifically, spin blank 115 includes a large diameter 117 corresponding to a large component 1700 (see for example, FIG. 17).

Figure 3:
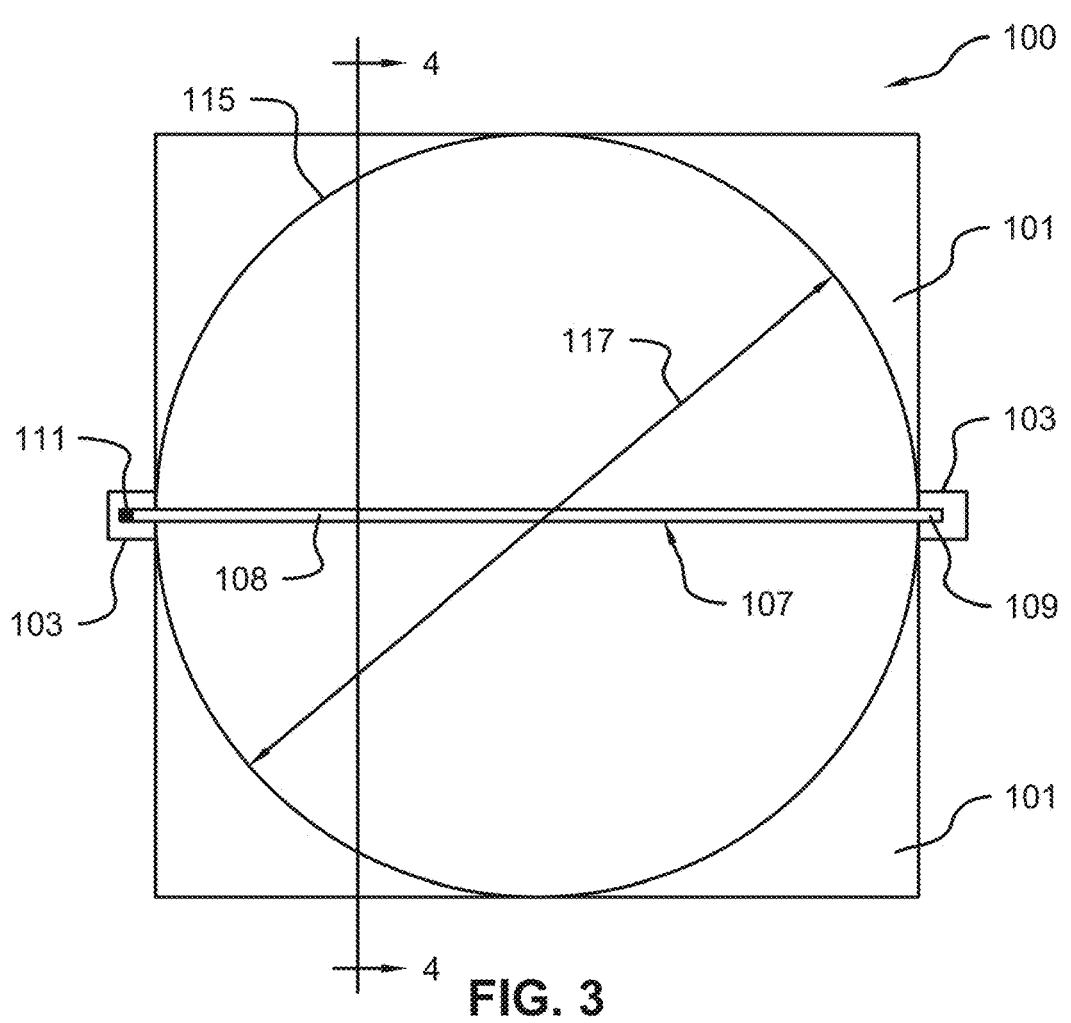
FIG. 3 shows a schematic view of a weld setup according to the present disclosure after welding.

Method 500 includes positioning a first metallic plate 101 and a second metallic plate 102 in an abutting arrangement (step 501). The first metallic plate 101 and the second metallic plate 102 include faying surfaces 105 at a point of abutment 107. While FIG. 1 shows only two metallic plates, including the first metallic plate 101 and the second metallic plate 102, any number of plates may be used, provided the plates are in an abutting arrangement such that they may be friction stir welded together. The first metallic plate 101 and second metallic plate 102 may be any suitable metallic material that may be friction stir welded together to form a spin blank 115. Suitable materials may include, but are not limited to, aluminum or aluminum alloy plates. In one embodiment, first metallic plate 101 and second metallic plate 102 may be provided in either the F (as-rolled), O temper (annealed), or T3 temper (SHT, quench, cold worked). In one embodiment, first metallic plate 101 and second metallic plate 102 are rectangular and substantially identical in size and thickness. For example, in one embodiment, first metallic plate 101 and second metallic plate 102 may be 109 inches or greater in width, 218 inches or greater in length, and ½ inch or greater in thickness. In addition, as shown in FIGS. 1 and 3, run-on/off tabs 103 are attached, adhered, or formed at distal ends of the point of abutment 107 of the first metallic plate 101 and second metallic plate 102. In one embodiment, run on/off tabs 103 are attached by tack welding. Run-on/off tabs 103 provide additional material to the welding setup 100 at the point of initiation of the stir welding operation and at the point of termination of the stir welding operation. Method 500 further includes attaching a backing plate 201 spanning the point of abutment adjacent the faying surfaces 105 (step 503). The backing plate 201 may include the material of the same alloy as first metallic plate 101 and second metallic plate 102 or may include other compatible materials (see FIG. 2). The backing plate 201 is position in the welding setup 100 such that the backing plate 201 receives at least the tip of the welding tool 401 (see for example, FIG. 4) during welding. That is, the backing plate 201 is positioned so that, after welding, the weld root 405 terminates in the backing plate 201. In one embodiment, the sacrificial backing plate 201 includes a width greater than or equal to 4T (four times the thickness) of the plates 101, 102 and a thickness greater than or equal to ⅓ T (one third times the thickness) of the plates 101, 102. The backing plate 201 may extend below the run-on/off tabs 103.

Figure 4:
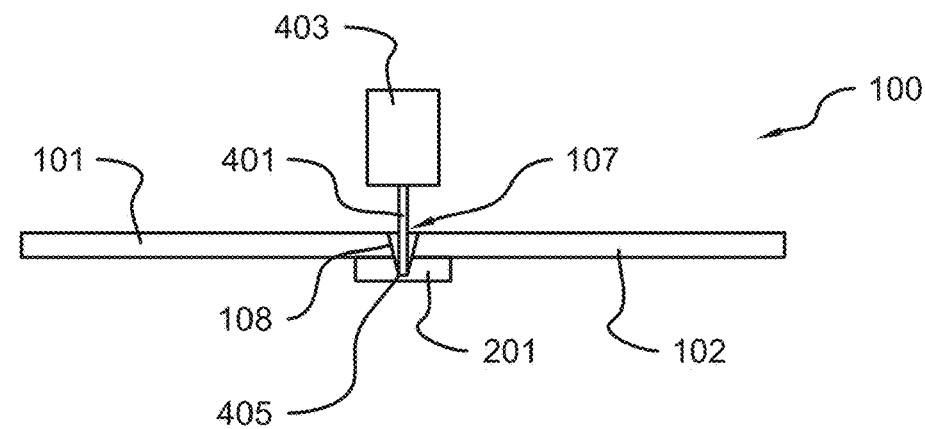
FIG. 4 shows a sectional view of FIG. 3 taking in direction 4-4.
Figure 6:
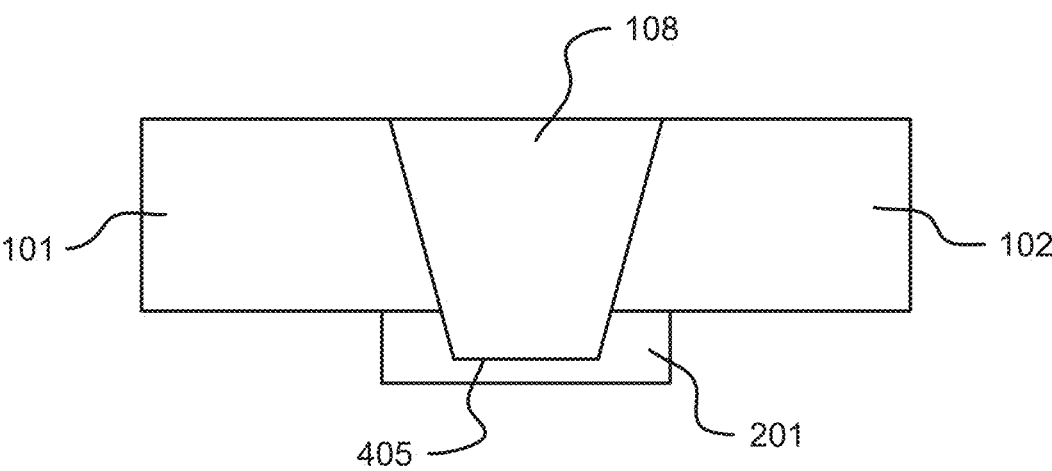
FIG. 6 shows a schematic view of two welded plates that have been welded according to a method of the present disclosure.
Figure 7:
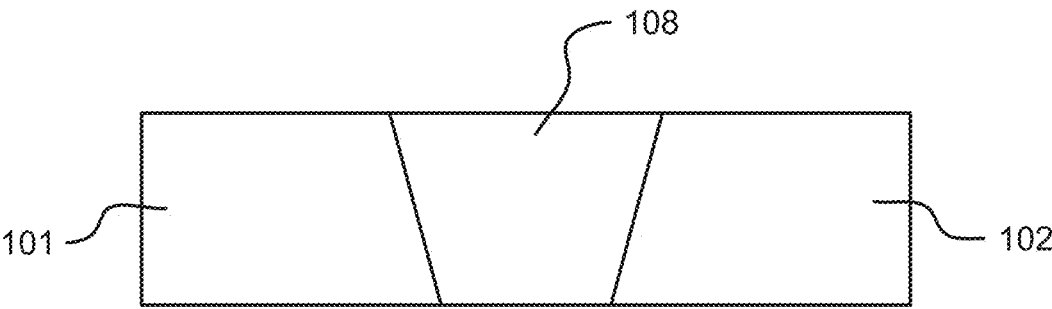
FIG. 7 shows a schematic view of the welded plates of FIG. 6 having the backing plate removed according to a method of the present disclosure.
Figure 8:
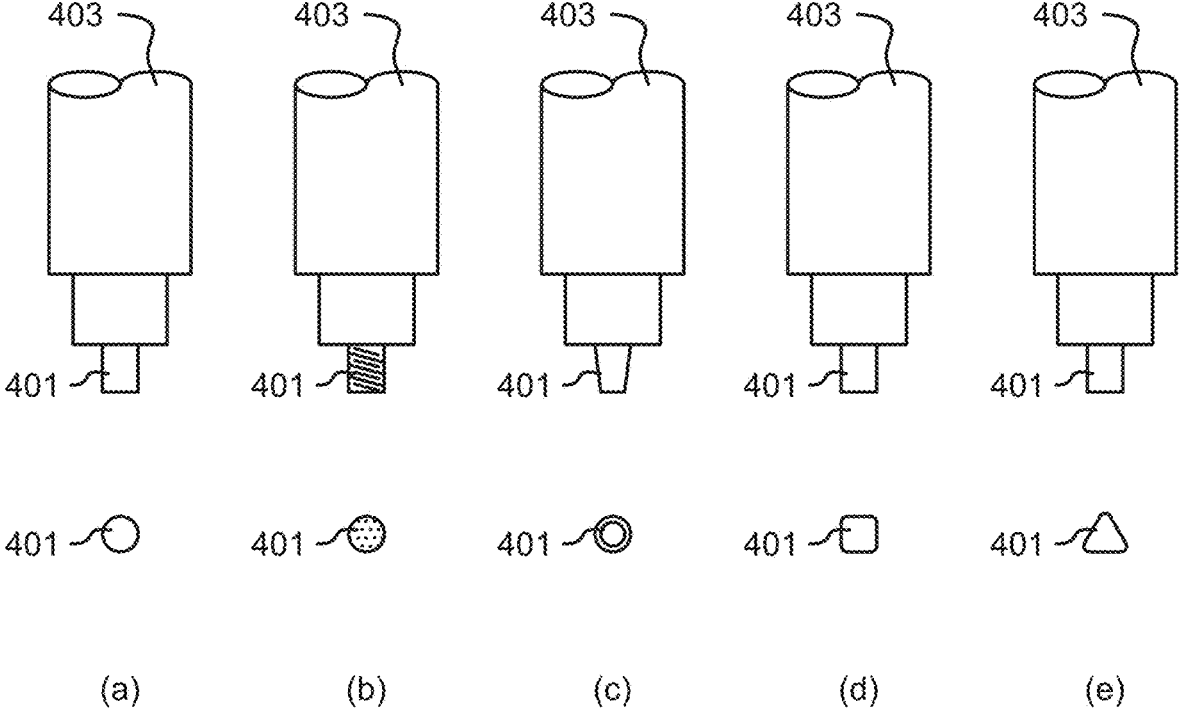
FIG. 8 show an elevational view and a sectional view of exemplary friction stir welding tool geometries according to an embodiment of the present disclosure.

The first metallic plate 101, second metallic plate 102 and the backing plate 201 are welded together with a friction stir welding apparatus 403 to form a friction stir weld 108 using a single-sided, fixed tool, friction stir welding process with a low RPM and slow feed rate. The stir welding apparatus 403 is configured to rotate a welding tool 401 at a speed sufficient to accomplish friction stir welding and advance the welding tool 401 along a path at the faying surfaces 105 to form the friction stir weld 108. The welding tool 401 may be any tool suitable for use with a friction stir welding apparatus 403. In one embodiment, the welding tool 401 is a pin. The geometry of the welding tool 401 is any suitable geometry for friction stir welding faying surfaces 105. While the welding tool 401 according to the present disclosure is not so limited, FIG. 8 shows examples of alternative friction stir welding tool geometries suitable for use with the friction stir welding apparatus 403 according to the present disclosure. As shown in FIG. 8, the upper section of the figure shows an elevation view of the friction stir welding apparatus 403 and the lower portion of the figure shows a cross-sectional view of the welding tool 401. As shown in FIG. 8, different geometries may be used. While not so limited, as shown in FIG. 8, suitable geometries may include geometry (a), which is a cylindrical pin geometry, geometry (b), which is a cylindrical pin geometry having threads, geometry (c), which is a tapered cylindrical pin geometry, geometry (d), which is a square tool geometry, and geometry (e), which is a triangular geometry. The friction stir welding tool 401 has a sufficient length to extend past the faying surfaces 105 of the first metallic plate 101 to the second metallic plate 102 into backing plate 201 (step 505). In one embodiment, the welding tool 401 extends at least halfway through the thickness of the backing plate 201 during welding. In another embodiment the welding tool 401 extends at least 75% of the thickness of the backing plate 201. However, in embodiments of the present disclosure, the welding tool 401 is not permitted to extend through the entire thickness of the backing plate 201. This single side/single pass low rpm and slow feed rate welding process yields a deposited friction stir weld 108 with material properties as similar to metal of the first metallic plate 101 and the second metallic plate 102 as possible. In certain embodiments of the present disclosure, the friction stir welding may include welding parameters in accordance with AWS D17.3 (2021), including speeds, feed rates, and iterations utilized to match material chemistry variations as well as subsequent effective heat treatments to maximize the weld properties. The method 500 according to the present disclosure maximizes weld formability and allows formation of large aerospace structures without formation of a brittle weld that is typical of as-welded known aluminum friction stir weld assemblies. Effective friction stir welding parameters will vary depending on weld joint thickness. Suitable friction stir welding parameters may include, but are not limited to, tool rotational speed in a range of 50 to 150 rpm, with feed rate range of 0.5 and 2.5 inches per minute (IPM). As shown in FIGS. 3, the friction stir welding process begins with providing the friction stir welding tool 401 to entry point 109 and run along the faying surfaces 105 of first metallic plates 101 and second metallic plates 102. The welding is continued until the welding tool 401 has advanced into the run-of/off tab 103 to exit point 111 to form friction stir weld 108. As shown in FIG. 4, the weld root 405 terminates in the backing plate 201. Weld root 405 is the point in weld at or near where friction stir welding tool 401 terminates during the welding process (see also FIG. 6). FIG. 6 shows a schematic view of the first metallic plate 101, second metallic plate 102 and the backing plate 201 after welding.

Optionally, after the friction stir welding is completed, the friction stir weld 108 may be inspected in the welding setup 100 via any suitable weld inspection technique. Suitable weld inspection techniques include, but are not limited to, phased array ultra-sonic (PAUT) volumetric inspection for defects to a NASA-STD-5009 (revision B, May 8, 2019) standard or better.

After inspection, the backing plate 201 is removed from the weld set-up 100 to form a welded blank (step 508). In addition, the backing plate 201, run-on/off tabs 103 are removed from welded plates 101, 102 by machining. The machining may be accomplished with any known machining process known for machining the material of the first metallic plates 101 and second metallic plates 102. In one embodiment, the weld may be machined flush to the weld plates 101,102 on one side and the backing plate 201 is removed and the weld is machined flush on the opposite side.

Figure 15:
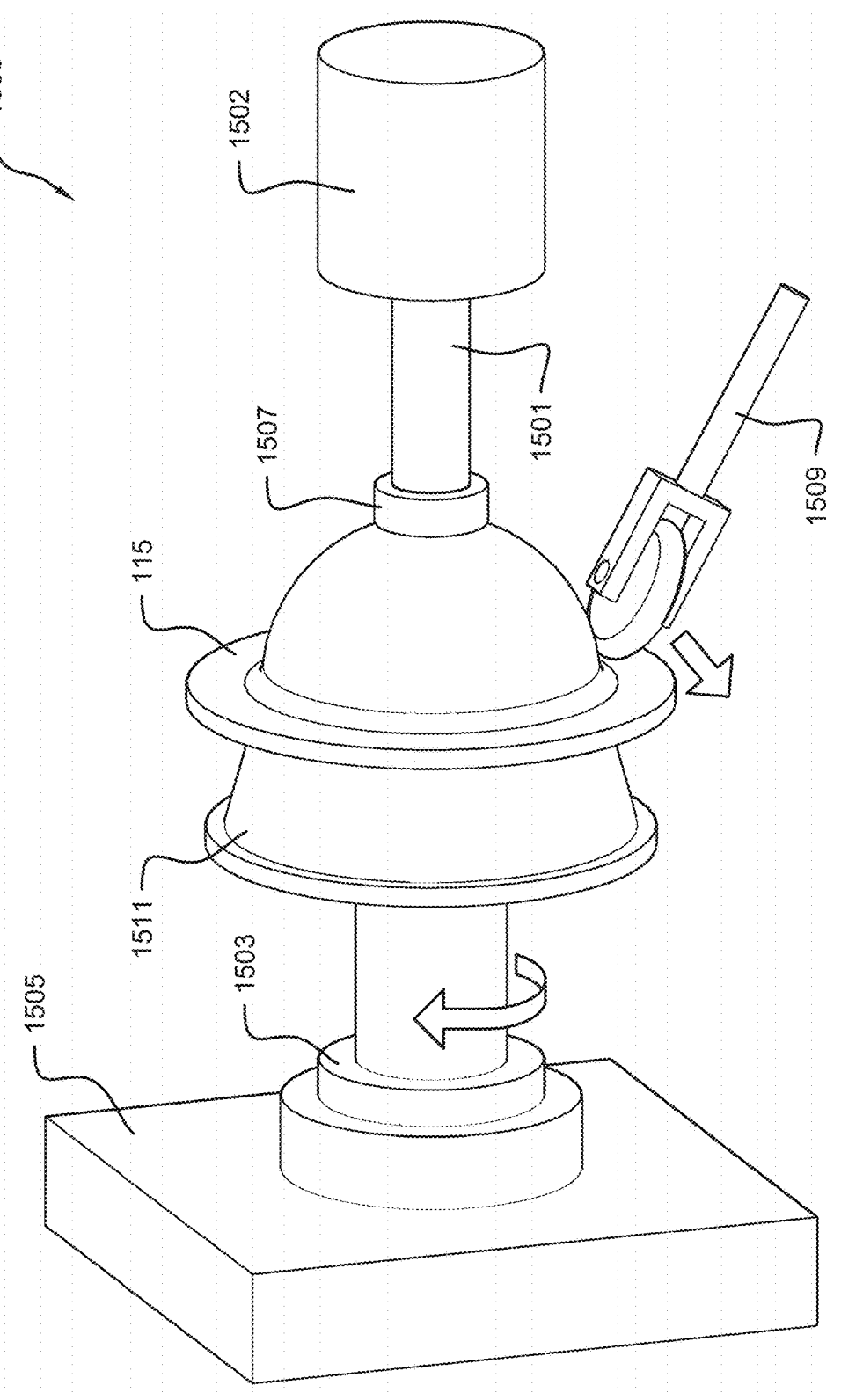
FIG. 15 schematically illustrates a spin forming apparatus utilizing a blank formed by a method according to the present disclosure.
Figure 16:
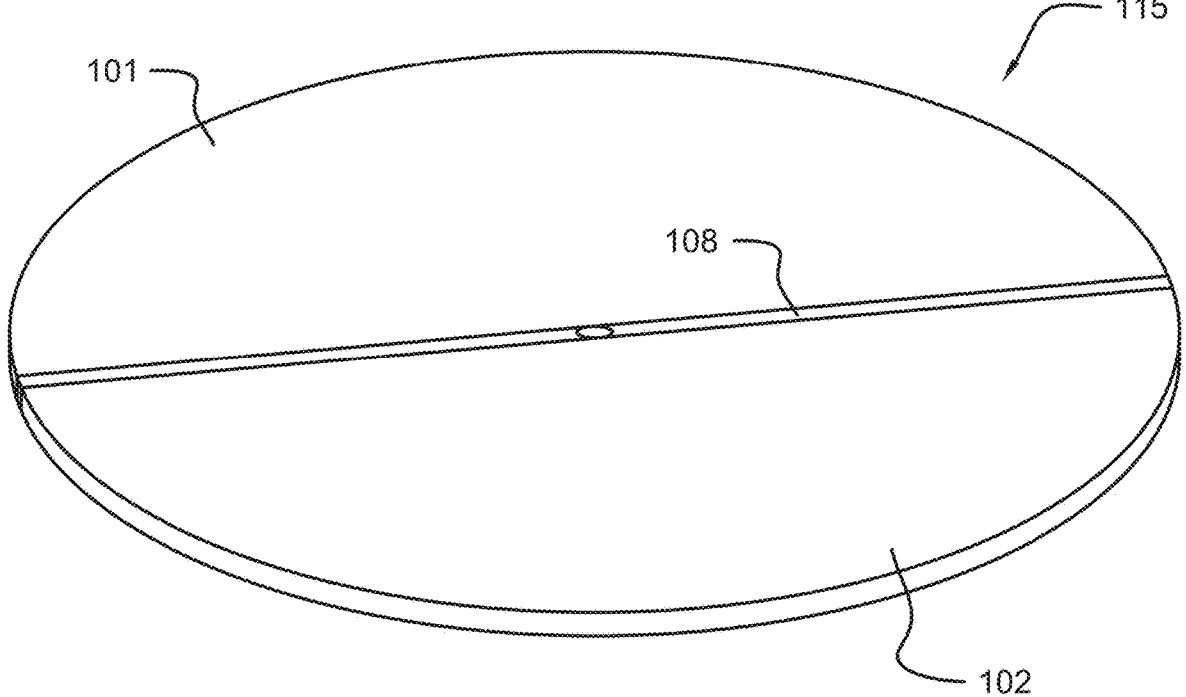
FIG. 16 shows a welded spin blank according to an embodiment of the present disclosure.

In addition, the spin blank 115 as shown in FIGS. 1, 3 and 15 may be a round or circular diameter. However, the geometry is not so limitation and other suitable geometries may be utilized for the spin blank 115. For example, FIG. 16 shows a round spin blank 115 after welding ready for forming of the component 1700.

Figure 17:
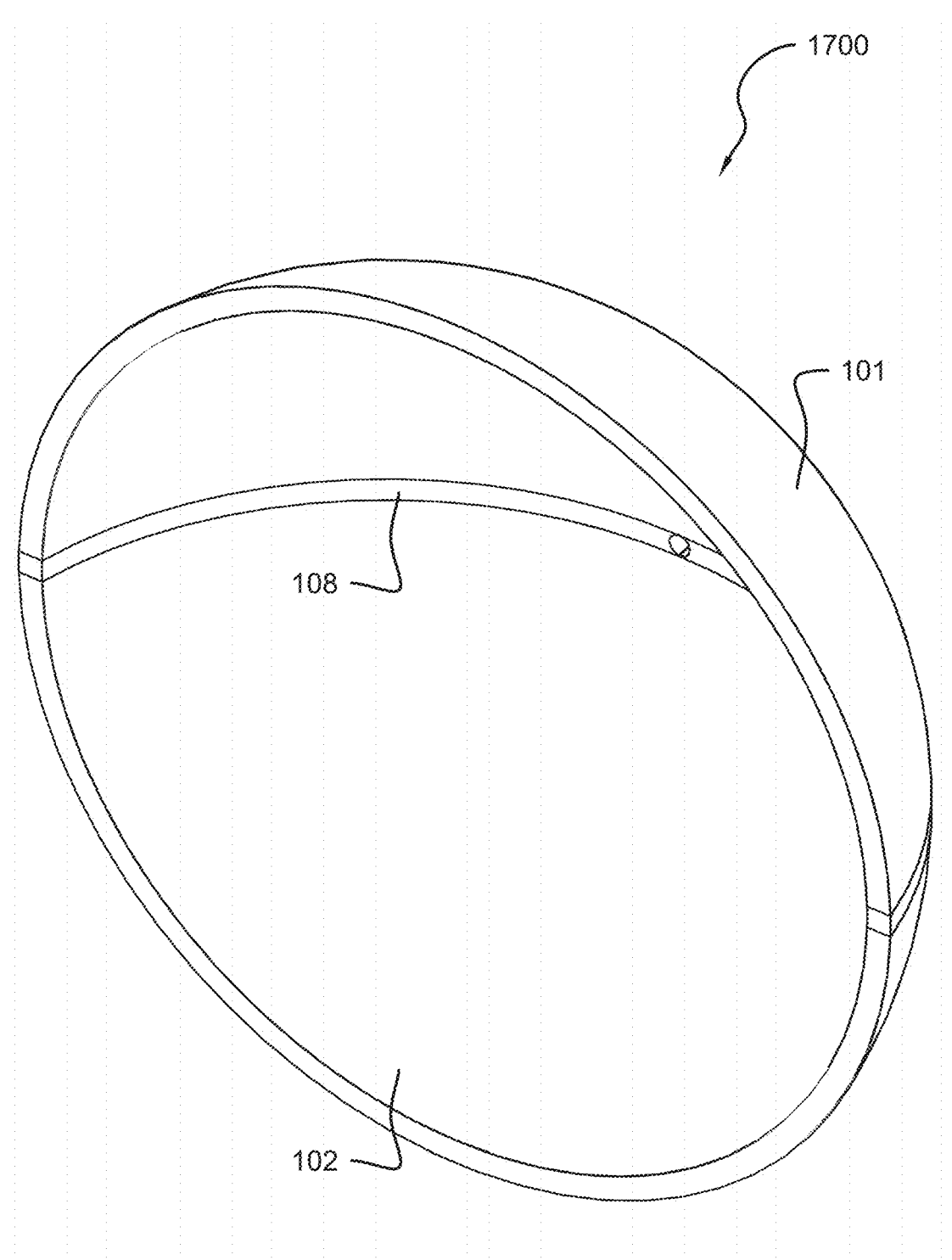
FIG. 17 shows a shaped component formed from a welded spin blank according to an embodiment of the present disclosure.

After formation of the welded blank, method 500 further includes forming the welded blank into a component form (step 509). The forming may be any suitable forming process for forming large components. Particularly suitable processes may include, but are not limited to, known spin-forming or stretch spin-forming processes. An exemplary apparatus for use with the method 500 according to the present disclosure, is shown in FIG. 15. Suitable known processes for spin forming are likewise disclosed in NASA Report #NESC-RP-13-00884 Section 7.6 and U.S. Pat. No. 6,199,419 B1, both of which are hereby incorporated by reference in their entirety. FIG. 17 shows a formed component 1700 according to an embodiment after the welding of step 509.

FIG. 15 shows an exemplary spin forming apparatus for spin forming the spin blank 115 into component 1700. As shown in FIG. 15, the spin blank 115 is mounted onto a shaft 1501 extending between a tailstock 1502 and a headstock 1505. The spin blank 115 rotated on the shaft 1501 with a spindle 1503 driven by a motor (not shown) in a headstock 1503. The spin blank 115 is retained in position with a clamp or follower 1507 that retains the spin blank 115 in position along shaft 1501. A forming roller 1509 is directed into and along spin blank 115 to deform the metallic material of the spin blank 115 into a desired shape. A mandrel 1511 is positioned between the spindle 1503 and the spin blank 115 and has an outer surface having geometry corresponding to the desired geometry of the spun formed or finished component 1700 (see for example, FIG. 20). The forming roller 1509 is directed into and along spin blank 115 until a surface of the spin blank 115 contacts and conforms to the outer surface of the mandrel 1511.

After the effective spin-forming deformation formation (step 509), the spun component 1700 may be heat treated (step 511) to achieve the desired material properties. The temperature and process times for each aluminum alloy are specific to that alloy's chemistry. Examples of suitable heat treatment steps for metallic components are disclosed in at least U.S. Pat. Nos. 5,066,342, 6,562,154, 7,490,752, and 9,090,950, each of which is incorporated by reference in their entirety.

In certain embodiment, a recovery anneal, or intermediate annealing treatment may be utilized. If a recovery anneal or intermediate annealing treatment "IAT" is used, the temperature will typically be several hundred degrees below the alloy's solvus temperature. Following the "IAT" the component is solution heat treated and quenched in a water or water-glycol solution quench bath. The "IAT", if utilized, may be performed as a separate process step, or performed in conjunction with the solution heat treatment process. For example, a suitable heat treatment process in aluminum alloy 7075 is to perform the "IAT" at 500° F. and then air cool to room temperature, followed by a solution heat treatment at 870° F. for 180 minutes and quenching into a 16% water-glycol solution quench bath.

In another embodiment, the component 1700 may require a "T8" material property. In this embodiment, a cold spin-forming deformation process may be carried out after the solution heat treatment and before the final precipitation heat treatment. The component 1700 will then be age heat treated to final temper requirements using a precipitation heat treatment cycle. Suitable heat treatments will vary depending on alloy, some may require a period of natural aging at ambient room temperature before performing a precipitation heat treatment cycle. For example, a suitable age heat treatment process in aluminum alloy 7075 is to allow the component 1700 to naturally age in ambient conditions for 96-100 hours following quenching then to precipitation heat treat by soaking the component 1700 at 250° F. for 16 hours then soaking the component 1700 at 325° F. for 16 hours.

Figure 18:
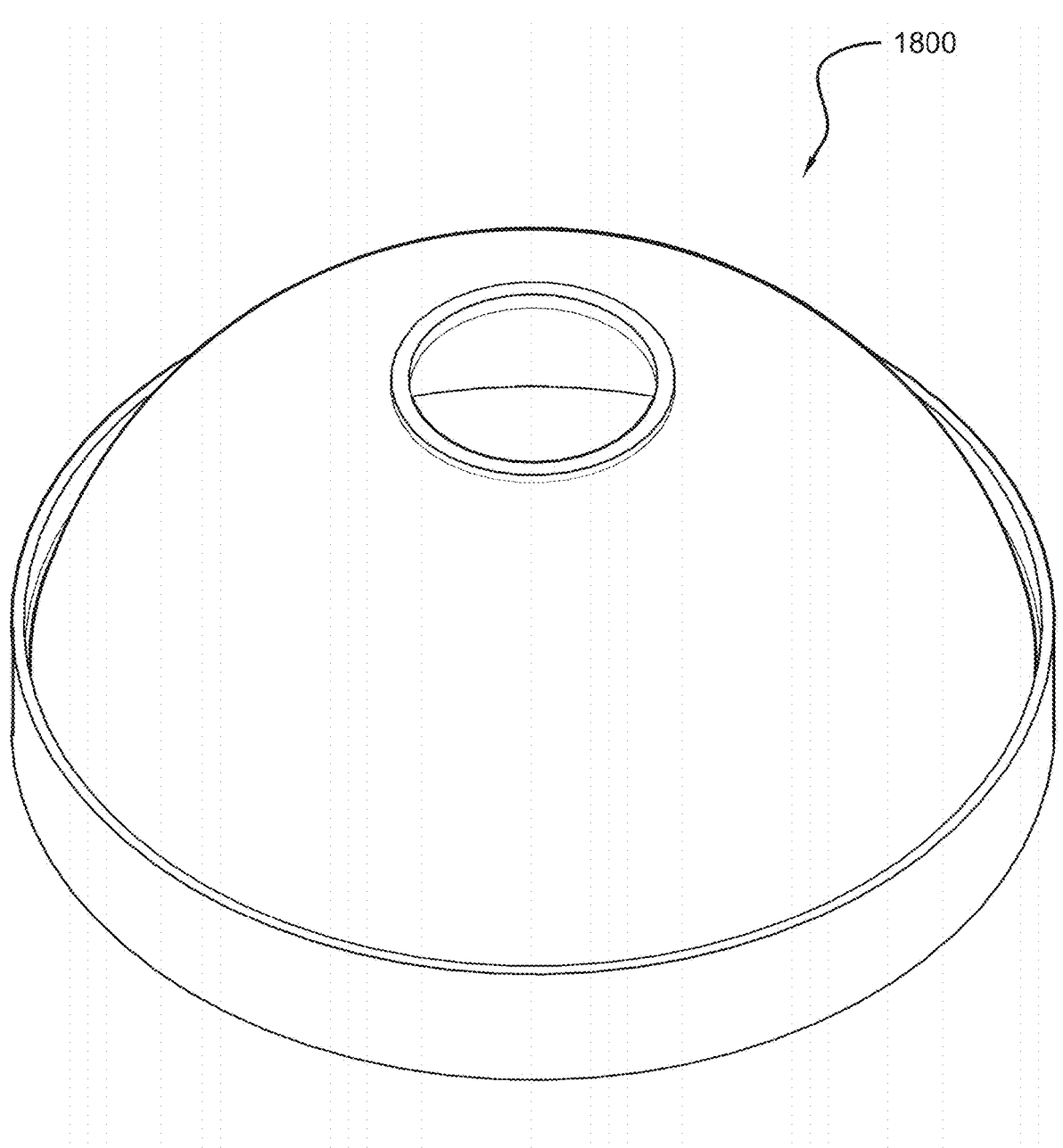
FIG. 18 shows a final component formed from the shaped component of FIG. 17 after heat treatment, aging and machining.

Test coupons may be removed from the formed and heat-treated component 1700 to verify weld metal and base metal properties. The component 1700 may further include traditional, known manufacturing sequences (milling/turning/drilling etc.) to complete the product to its dimensional requirements. FIG. 18 shows a final component 1800 formed from the shaped component 1700 after heat treatment, aging and machining.

Friction stir weld 108 formed by the method according to the present disclosure includes a weld efficiency of from about 95% to 98% or greater than 95% or greater than 97% or greater than 98% weld efficiency compared to base metal of first metallic plates 101 and second metallic plates 102, required minimum properties for room temperature tensile strength. Weld joint efficiency is defined as FSW Ultimate Tensile Strength divided by Base Metal Ultimate Tensile Strength.

Examples

Figure 9:
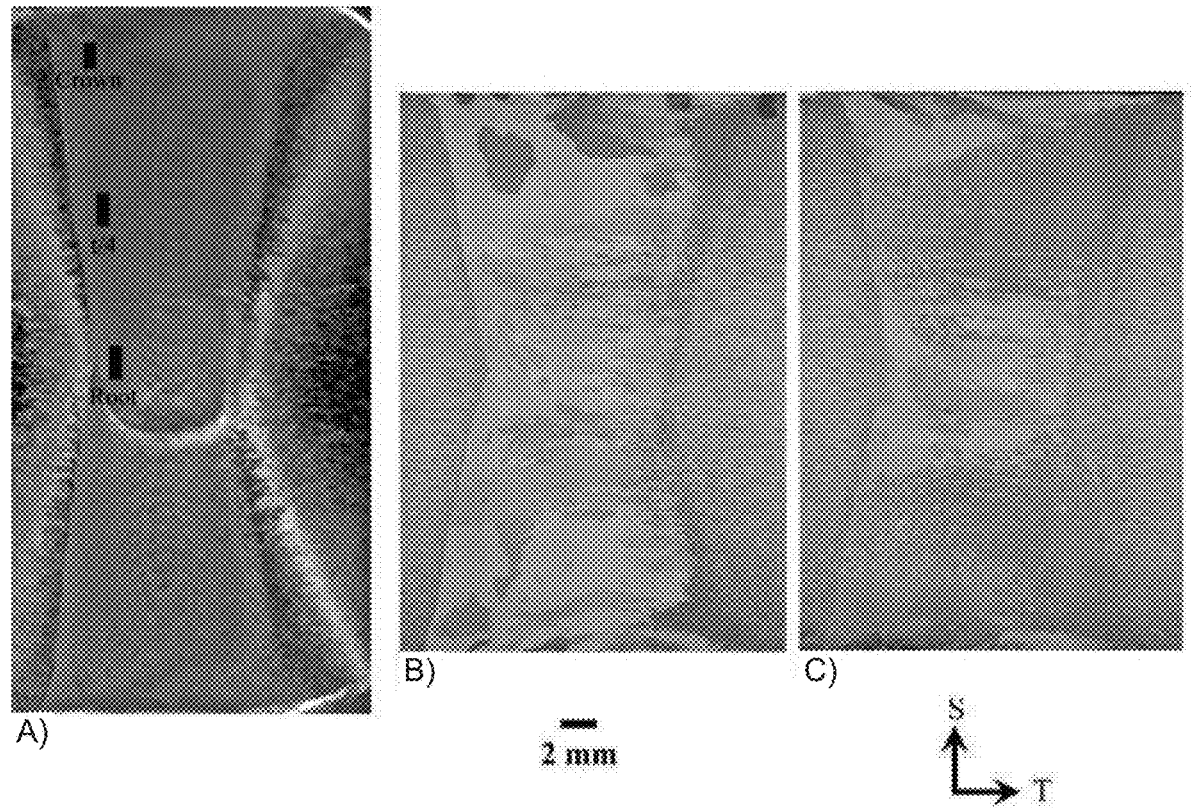
FIG. 9 shows photomicrographs from welded samples welded according to known friction stir welding procedures.

In a known comparative process performed by NASA, samples were welded on opposites sides of the abutting surface with friction stir welding (double pass FSW) performed utilizing known conditions. (NASA Document ID #20140001083: Investigation of Abnormal grain growth in a Friction Stir welded and Spin-Formed AL-LI Alloy 2195 Crew Module). FIG. 9 shows photomicrographs of the weld with various process treatments; as-friction stir welded (FSW), FSW+25% hot rolling reduction (HR)+solution heat treatment (SHT), and FSW+25% HR+ intermediate annealing treatment (IAT)+SHT. All The welds shown in FIG. 9 include AGG growth in the center/overlap of the double pass friction stir weld. "AGG with the FSW poses the greatest risk in terms of *meeting* mechanical property specifications" from NASA document ID 20140001083.

Figure 10:
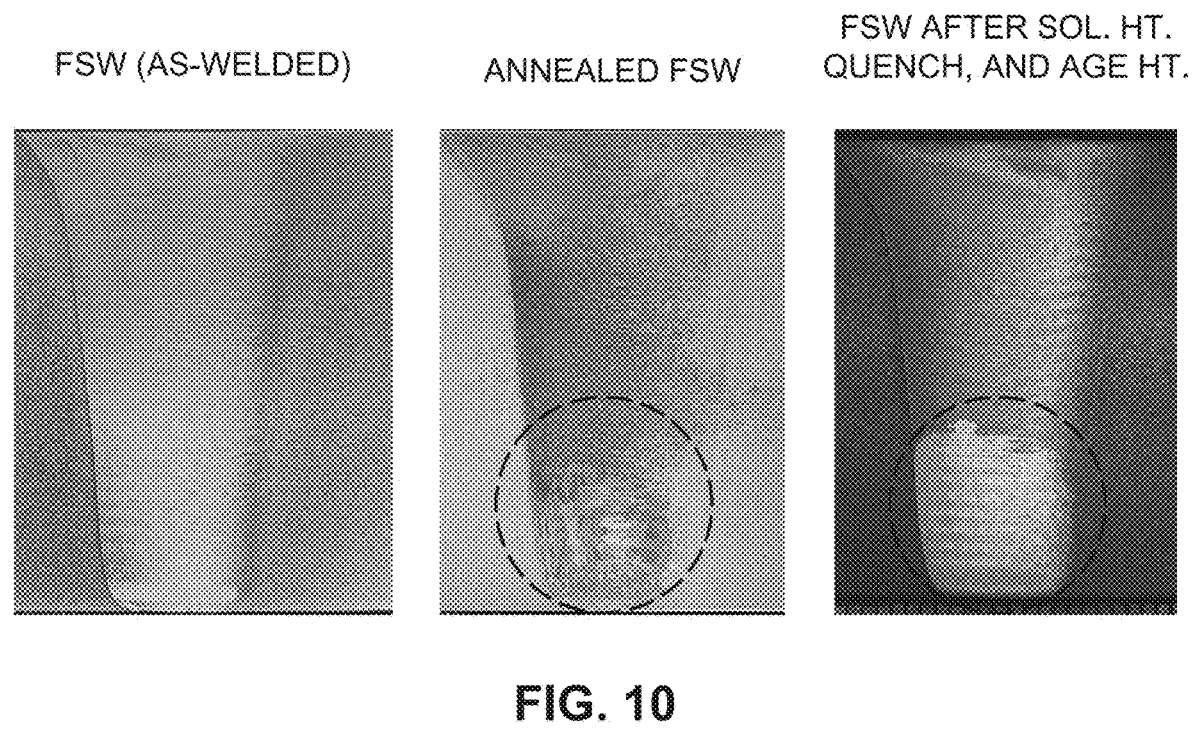
Figure 11:
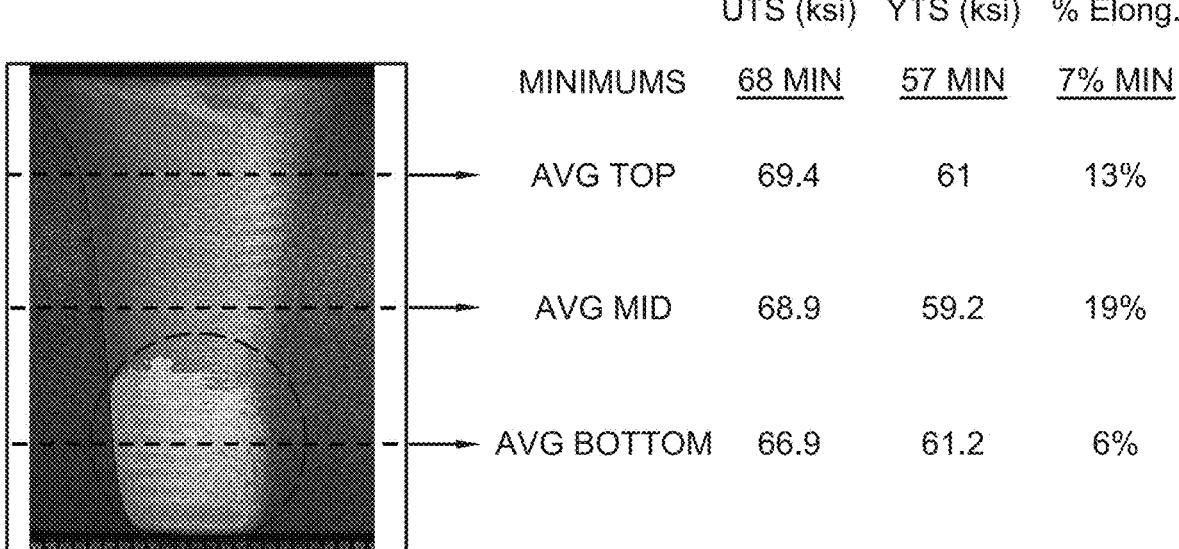
FIG. 11 shows a photomicrograph illustrating the effect of AGG on weld properties of a welding procedure not utilizing a backing plate.

In another comparative example, FIG. 10 shows photomicrographs from welded samples welded according to a friction stir welding procedure not utilizing a backing plate. As can be seen in FIG. 10, AGG formed at the weld root. FIG. 11 shows a photomicrograph of the welded sample from FIG. 10, that was friction stir welded, solution heat treated, quenched, and aged, showing weld properties at various locations along the weld. As can be seen in FIG. 11, the AGG formed in the weld (present in the "Bottom" as shown on the chart of FIG. 11) detrimentally affect properties, including ultimate tensile strength (UTS) and % elongation.

Figure 12:
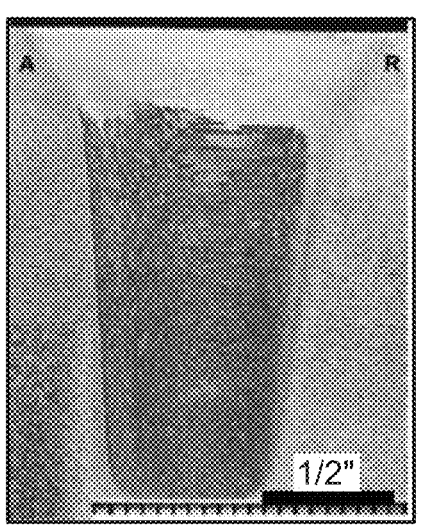
FIG. 12 shows a photomicrograph showing the microstructure of a weld without the use of a backing plate after an annealing cycle.

FIG. 12 shows a weld formed without a backing plate 201, where AGG nucleated from the weld root through the crystalline matrix of majority of the weld metal when subjected to the alloy's solution heat treatment per AMS 2770 (2020). FIG. 12 illustrates an example of how the AGG can nucleate from the tip of the tool, as shown in FIG. 11, and can propagate through the crystalline matrix of most of the weld metal when subjected to the alloy's solution heat treat temperature of typically 900-1000° F.

Figure 13:
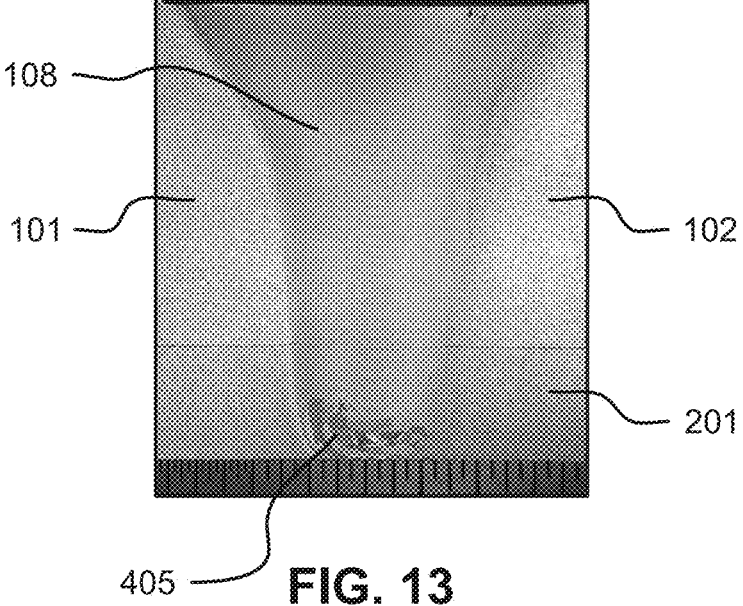
FIG. 13 shows a photomicrograph showing the microstructure of a weld after a solution heat treatment wherein the backing plate is in position below the point of abutment.
Figure 14:
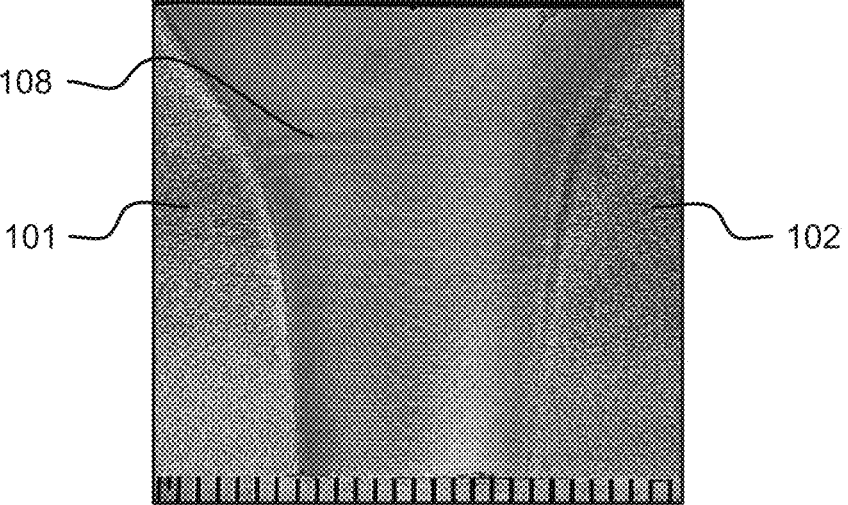
FIG. 14 shows a photomicrograph showing the microstructure of a weld formed according to an embodiment of the present disclosure where the backing plate was removed prior to annealing.

FIGS. 13 & 14 show photomicrographs from the same friction stir weld 108 after an annealing heat treatment per AMS 2770. FIG. 14 includes an example according to the present disclosure, where backing plate 201 has been removed prior to forming and heat treatment. In FIG. 13 the backing plate 201 was left on during the during the annealing heat treatment and in FIG. 14 the backing plate 201 was removed prior to the annealing heat treatment and is an embodiment of the present disclosure. In the FIG. 13 photomicrograph, AGG is present in the tip of the weld after the annealing heat treatment. In the FIG. 14 photomicrograph, the microstructure is stable and no AGG is present in the weld. FIG. 13 shows an example of welding with a backing plate 201 showing AGG starting in the tip of the weld after an annealing cycle at 775° F. FIG. 14 shows an example of how AGG can be controlled by removing the backing plate 201 before forming and heat treatment. The sample of FIG. 14 was annealed at 775° F. and remained stable.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes, and omissions may be made in the design, operating conditions, and arrangement of the exemplary embodiments without departing from the scope of the present application.

The invention claimed is:

1. A method for forming a metallic component comprising:

positioning a first metallic plate and a second metallic plate in an abutting arrangement, the first metallic plate and the second metallic plate having corresponding faying surfaces at a point of abutment;

attaching a backing plate spanning the point of abutment adjacent the faying surfaces;

friction stir welding the first metallic plate to the second metallic plate to form a friction stir weld along the faying surfaces, the backing plate receiving an end of a friction stir welding tool during the friction stir welding, the friction stir welding tool forming a weld root in the backing plate;

removing the backing plate, including the weld root, prior to exposure to elevated temperatures including an elevated temperature forming, a heat treatment and an aging to form a welded blank;

forming the welded blank into a component form; and the heat treatment and the aging of the component form; wherein the removing the backing plate including the weld root prior to the elevated temperature forming, the heat treatment and the aging results in a stable microstructure in the component form having no abnormal grain growth during the heat treatment and the aging.

2. The method of claim 1, wherein the positioning a first metallic plate and a second metallic plate in an abutting arrangement is positioning in a weld fixture.

3. The method of claim 1, wherein forming the welded blank includes spin forming or stretch spin-forming the welded blank.

4. The method of claim 1, providing a first run-on/off tab and a second run-on/off tab at distal ends of the point of abutment of the first metallic plate and the second metallic plate.

5. The method of claim 4, wherein the friction stir welding includes commencing the welding at the first run-on/off tab and ending the welding in the second run-on/off tab, the friction stir welding including positioning the end of the friction stir welding tool to form the bottom of the weld in the backing plate.

6. The method of claim 1, wherein attaching the backing plate includes mechanically retaining the backing plate in position with a clamp.

7. The method of claim 1, wherein attaching the backing plate includes welding or adhering the backing plate into position spanning the point of abutment adjacent the faying surfaces.

8. The method of claim 1, wherein the friction stir welding tool is a pin.

9. The method of claim 1, wherein the first metallic plate and the second metallic plate include aluminum or aluminum alloy.

10. The method of claim 1, wherein the backing plate backing plate width is greater than or equal to four times the thickness of one or both of the first and second metallic plates and a thickness greater than or equal to one third times the thickness of one or both of the first and second metallic plates.

11. The method of claim 1, wherein the welding tool extends at least halfway through the thickness of the backing plate during welding.

12. The method of claim 1, wherein the friction stir welding includes a tool rotational speed in a range of 50 to 150 rpm and a feed rate range of 0.5 and 2.5 inches per minute.

13. The method of claim 1, wherein the heat treatment includes a solution heat treatment.

14. The method of claim 13, wherein the heat treatment includes a recovery anneal or intermediate anneal prior to the solution heat treatment.

15. The method of claim 13, wherein a cold spin-forming deformation process is carried out after the solution heat treatment and before a final precipitation heat treatment.

16. The method of claim 1, wherein the aging includes natural aging at room temperature.

17. The method of claim 1, wherein the friction stir weld has a weld efficiency of greater than 95%.

18. The method of claim 1, wherein the component form includes a dimension greater than 100 inches.

19. The method of claim 18, wherein the component form has a rounded geometry.

20. A method for forming a metallic component comprising:

positioning a first metallic plate and a second metallic plate in an abutting arrangement, the first metallic plate and the second metallic plate having corresponding faying surfaces at a point of abutment;

attaching a backing plate spanning the point of abutment adjacent the faying surfaces;

friction stir welding the first metallic plate to the second metallic plate to form a friction stir weld along the faying surfaces, the backing plate receiving an end of a friction stir welding tool during the friction stir welding, the friction stir welding tool forming a weld root in the backing plate;

removing the backing plate, including the weld root, prior to exposure to elevated temperatures including an elevated temperature forming, a heat treatment and an aging to form a welded blank;

forming the welded blank into a component form; and the heat treatment and the aging of the component form;

wherein the removing the backing plate including the weld root prior to the elevated temperature forming, the heat treatment and the aging results in a stable microstructure in the component form having no abnormal grain growth during the heat treatment and the aging and the second metallic plate include an F temper.

21. The method of claim 1, wherein the first metallic plate and the second metallic plate include an F temper, an O temper, or a T3 temper.

* * * * *